Aug. 21, 1956 C. H. SAUER 2,759,565
BRAKE SYSTEM FOR WHEEL SUPPORTED VEHICLES INCLUDING
STRUCTURE FOR TRANSMITTING BRAKING TORQUE FROM
WHEELS TO THE VEHICLE FRAME
Filed Dec. 8, 1952 2 Sheets-Sheet 1
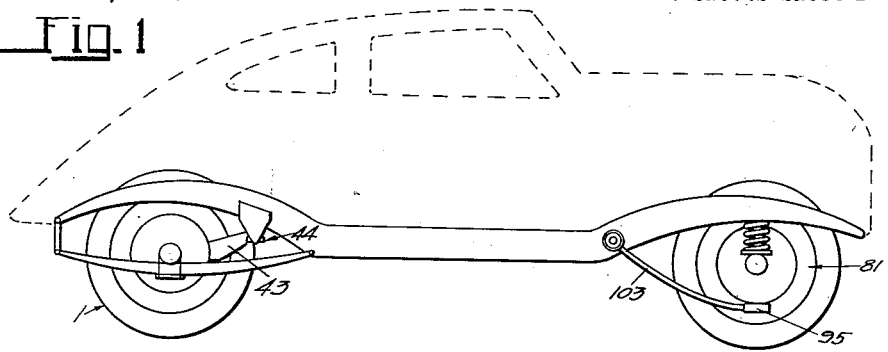
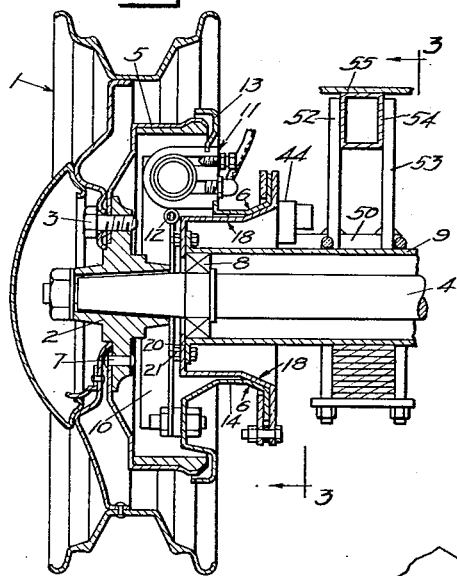
INVENTOR.
CHRISTIAN H. SAUER
BY
Boyken, Mohler & Beckley
ATTORNEYS

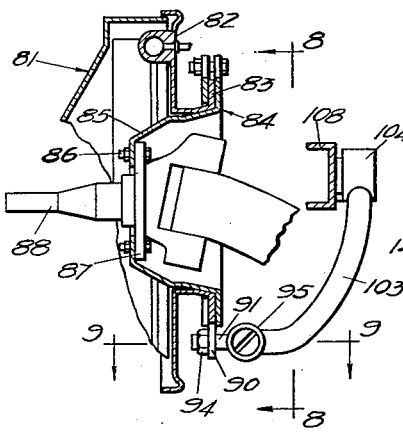
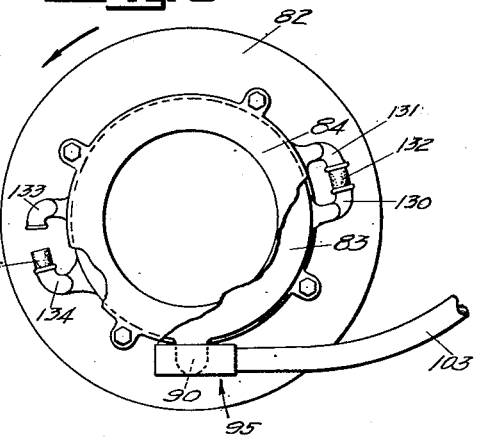
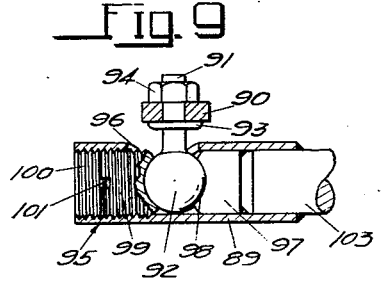
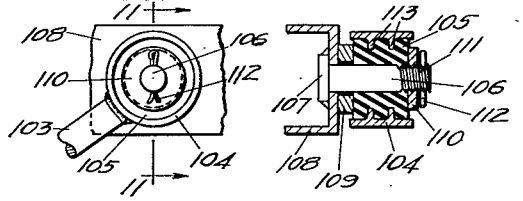
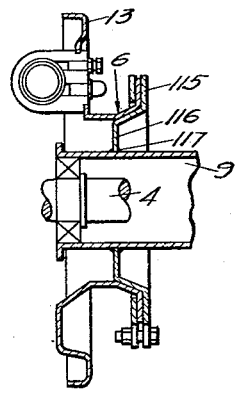

United States Patent Office 2,759,565
Patented Aug. 21, 1956

2,759,565

BRAKE SYSTEM FOR WHEEL SUPPORTED VEHICLES INCLUDING STRUCTURE FOR TRANSMITTING BRAKING TORQUE FROM WHEELS TO THE VEHICLE FRAME

Christian H. Sauer, Chico, Calif.

Application December 8, 1952, Serial No. 324,754

12 Claims. (Cl. 188—2)

This invention relates to a brake system for a wheel supported vehicle, including aircraft having ground wheels, and has for its principal object the provision of improved structure in a means for transmitting the braking torque from the wheels to the vehicle frame. In my United States Letters Patent No. 2,434,055, dated January 6, 1948, I show a brake system that is similar to the present one insofar as the rear wheels of a vehicle, such as an automobile, are concerned. This system generally provides rotatable backing plates that are connected with the frame so that the torque of the wheels will be transmitted directly to the frame when the braking elements on the backing plates are moved into braking relation with the brake drums that are on the wheels, or the equivalent.

It will be apparent that in such a system, the backing plates must be rotatably supported, and the bearings supporting such backing plates will tend to twist slightly relative to the axis of the axle on which they are rotatable, and they are subjected to considerable wear each time the brakes are applied.

In view of the foregoing, it has been found that a conventional cylindrical bearing will tend to wobble after a period of use so that the brake shoes wear round and their braking capacity becomes considerably reduced. This result is accelerated by the normal swaying of the vehicle body.

One of the objects of the present invention is therefore the provision of an improved bearing for rotatably supporting the backing plate so as to minimize wear on such bearing and at the same time effectively transmit the braking torque to the vehicle body.

Another object of the invention is the provision of a vehicle brake mounting means which will enhance the stability of the vehicle at all times, both front and rear and prevent undesirable swaying and tilting of the vehicle during braking thereof.

Yet another object of the invention is the provision of a backing plate mounting means which is adapted to be employed on the front wheels of a conventional automobile for transmitting the braking torque on said front wheels to the vehicle body in such a way as to prevent undesirable dipping and swaying of the front portion of the body during braking and which means does not interfere with the steering of the automobile.

Still another object of the invention is the provision of means for transmitting the braking torque to the vehicle body and which means also serves to stabilize the front body at all times.

Another object of the invention is the provision of means for connecting the rotatable backing plate of the rear wheels with the frame so as to transmit the braking torque to said frame when the vehicle is going forward to prevent undesirable dipping of the forward end and at the same time prevent raising of the rear end when the vehicle is braked when moving in the reverse direction.

Other objects and advantages will be apparent from the following specification and from the drawings.

Fig. 1 is a diagrammatic elevational view of an automobile with an embodiment of my invention indicated in position relative to the frame, wheels and body, the latter being indicated in broken lines.

Fig. 2 is a vertical sectional view through the left rear braking wheel and part of the axle housing and spring, the pneumatic tire being omitted from the wheel.

Fig. 3 is a fragmentary side elevational view of the rear wheel structure substantially as taken along lines 3—3 of Fig. 2, and showing the connection I provide between the brake and the frame of the automobile.

Fig. 4 is a vertical cross-sectional view through the structure of Fig. 3 as taken along lines 4—4 of that figure.

Fig. 5 is a greatly enlarged cross-sectional view through the bearing taken along lines 5—5 of Fig. 3 and showing the means for lubricating said bearing.

Fig. 6 is a modified form of the bearing structure shown in Fig. 5.

Fig. 7 is a vertical sectional view through a portion of a front braking wheel showing part of the axle and the connection I provide between the brake and the frame of the automobile.

Fig. 8 is a side elevational view of the structure of Fig. 7 as taken along lines 8—8 of Fig. 7.

Fig. 9 is an enlarged horizontal cross-sectional view through the connection between the backing plate bearing and the connecting arm to the frame.

Fig. 10 is an enlarged side elevational view of a portion of the frame of the automobile showing the connection I provide between the actuating arm and said frame.

Fig. 11 is a vertical cross-sectional view of the connection to the frame as taken along lines 11—11 of Fig. 10.

Fig. 12 is a vertical cross-sectional view through a modified form of the bearing.

Referring specifically to Fig. 2 a conventional automobile rear wheel 1 is shown which includes a rim for supporting a pneumatic tire (not shown). Wheel 1 is bolted to the wheel hub 2 by several bolts, one being indicated at 3. The wheel hub is keyed or otherwise suitably secured to the drive axle 4, and the brake drum 5 is also secured to said hub as by rivets, one of which is indicated at 7. A tapered bearing 8 is positioned between the axle housing 9 and the axle 4 thus providing for support and rotation of the axle in the stationary housing 9.

The foregoing elements and their arrangement are generally standard in passenger automobiles and in some trucks, although different but equivalent structure may be employed by different makers. The invention applies to both disc and cylindrical brakes.

It is conventional practice to provide brake shoes 10 in the brake drum 5, and to actuate such shoes for engagement between the lining thereon and the drum by a hydraulic mechanism such as generally indicated at 11, a spring 12 being provided to hold the shoes 10 retracted from the drum when the hydraulic mechanism is inoperative for applying the brakes.

With the present invention, the backing plate 13 is provided with a bearing plate 6 which includes a cylindrical hub 14 extending inwardly of axle 4 and concentric therewith (Figs. 2, 5). Secured to the end of hub 14 that is remote from backing plate 13 is an annular frusto-conical portion 15 which flares radially outwardly of hub 14 and is provided with a radially inwardly and axially directed surface 16 (Figs. 2, 5).

A bearing, generally designated 18 is provided for rotatably supporting the bearing plate 6. This bearing 18 comprises a generally cylindrical portion 19 spaced radially inwardly of hub 14 (Figs. 2, 5) and provided with a radially inwardly directed flange 20 at one end for connecting said bearing to housing 9 by means of bolts 21. The end of cylindrical portion 19 that is remote from flange 20 is provided with a frusto-conical bearing seat 22 complementarily formed with respect to portion 15. Bearing seat 22 thus provides a radially outwardly and axially directed bearing surface 23 which is adapted to engage the complementary bearing surface of the portion 15 which is rigid with the backing plate.

Bearing 18 is provided at its outer end with an annular radially outwardly extending flange 24 integral with the bearing seat 22. A similar annular radially outwardly extending extension 25 is formed on bearing plate 6 and is positioned in opposed relation to flange 24 on bearing 18 (Fig. 5).

For the purpose of urging bearing plate 6 into slidable engagement with bearing 18, I provide an annular member or ring 28 on the side of the extension 25 opposite flange 24. At spaced points around the periphery of flange 24, radially outwardly projecting ears 29 are provided and said ears are apertured to receive bolts 30 therethrough (Figs. 3, 5). Similarly, ring 28 is formed with corresponding ears 32 at said points, which ears are apertured to receive said bolts 30. By providing bolts 30 with nuts 31, it is obvious that the ring 28 may be urged toward extension 25 as desired so as to bring the bearing surface 16 of bearing plate 6 into slidable engagement with the complementarily formed bearing surface 23 of bearing 18. In the event that said bearing surfaces become worn, or if any wear results on ring 28 and extension 25 such wear may be readily compensated for by tightening nuts 31.

Inasmuch as excessive tightening of bolts 30 will cause too much friction between the bearing plate 6 and the bearing 18 it is preferable to insert tubular spacers 35 between the ears 29 and 32 (Fig. 5) and surrounding the shanks of bolts 30. By inserting spacers of different lengths or shims the pressure between the bearing plate 6 and the bearing 18 may be adjusted as desired so as to provide adequate support for the backing plate without causing undue resistance to rotation of the same in the bearing.

Complementarily formed grease grooves 36, 37 are provided on the engaging surfaces 16, 23 and grease fittings 38 may be installed at spaced points around the inner side of the conical seat 22 of bearing 18 to permit supplying grease to said grooves.

Similarly, grease grooves 39, 40 are formed in the engaging surfaces of ring 28 and extension 25 and grease fittings 41 are provided on ring 28 for supplying grease to said grooves. By the above described structure adequate lubrication of the relatively movable parts is insured.

To prevent grease from entering the wheel, I provide a plurality of openings 42 in the cylindrical hub portion 14 of the bearing plate 14.

It will be understood that rotation of the bearing plate 6 relative to the bearing 18 occurs only when the brakes are applied so that a relatively small amount of wear will take place thus necessitating only infrequent lubrication.

For the purpose of transmitting the torque impressed on the backing plate 13 to the frame of the vehicle an arm 43 (Fig. 3) is rigidly secured at its inner end to the extension 25 and extends radially outwardly from the bearing plate. As will more fully be described in greater detail, the length of arm 43 is preferably such that the downward pull on the frame will occur at a point within the laterally projected confines of the wheel 1 which includes the tire.

The outer end of arm 43 is provided with a semi-circular socket 44 which is adapted to receive therein the upper side of a disc-like member 45 of tough, resilient compressible material such as rubber. Socket 44 comprises a curved body portion 46 which extends around the upper half of the disc-like member 45 and to which is integrally secured a semi-circular flange 47 extending radially inwardly from said portion 46 and adapted to engage the adjacent side 48 of the member 45.

Member 45 is centrally apertured for mounting the same on a pin 50 which in turn is rigidly carried by the lower ends of a pair of spaced parallel plates 52, 53 welded at their upper ends to a convenient frame member such as the box frame 54 (Fig. 4). Any suitable frame may be employed so long as pin 50 is fixed to the body 55 of the vehicle.

To the side of flange 47 that is adjacent plate 52, a yieldable bumper 49 is secured as by screw 51. Pin 50 is provided at its free end with an enlarged head 56 for retaining member 45 on said pin. As best seen in Fig. 4, the arm 43 and plate 52 are positioned so that there is normally a space 57 between the outer side of bumper 49 and the adjacent side of plate 52. In addition, member 45 is normally spaced from the head 56 of pin 50. By this structure, it will be apparent that the body of the automobile is free to swing relative to the arm 43 and at the same time any downwardly directed force through arm 43 will be transferred to body 55 through the yieldable compressible member 45. If the arm 43 swings downwardly during a turn, bumper 49 will engage plate 52 or head 56 will be engaged by member 45 depending on the direction of turn. In any event, the arm 43 and body 55 are free for relative movement and a quiet operation is insured.

At the side of bearing plate 6 about diametrically opposite arm 43 is a generally radially outwardly extending arm 120 which may be rigidly secured as by welding to extension 25 of said bearing plate 6 (Fig. 3). A similar arm 121 is rigidly secured to flange 24 of bearing 18 so that arm 120 and arm 121 are in opposed relationship. A yieldable compressible bumper 122 of rubber or the like is secured to arm 121 as by screw 123 so as to be engaged by arm 120 when bearing plate 6 rotates counter-clockwise (Fig. 3).

In operation, when the brakes of the vehicle are applied to bring brake shoe 10 into frictional engagement with the brake drum 5, the backing plate 13 of the left rear wheel shown in Figs. 2–6 will rotate in a clockwise direction (Fig. 3) under the torque impressed on said brake drum by the brake shoes. This results in the arm 43 being swung downwardly so that a downwardly directed force is applied to pin 50 which in turn causes the body of the vehicle to be pulled downwardly against the urging of the body springs as fully described in my Patent No. 2,434,055 hereinbefore referred to.

The conical sliding surfaces of bearing 18 and bearing plate 6 insure that the backing plate 13 remains in its proper position relative to the brake shoes 10. In other words, wobbling of the bearing plate 6 is positively prevented so that the brake shoes always remain in a plane perpendicular to the brake drum surface which they engage. It is important to note that the conical shape of the relatively sliding surfaces permits accurate adjustment of the friction between bearing plate 6 and bearing 18 to the end that adequate support of the backing plate is achieved while still permitting it to rotate.

During the above described movement of arm 43, arm 120 will move upwardly away from arm 121. However, when the vehicle is moving in a reverse direction, and the brakes are applied, it will be apparent that arm 43, due to counter-clockwise rotation of bearing plate 6, will tend to swing upwardly away from member 45 and arm 120 will tend to swing towards arm 121 compressing the bumper 122 therebetween. In this way the arm 43 does not tend to urge the body of the vehicle upwardly at the rear end as it would do if said arm were attached to pin 50. The actual effect of the above described structure is to urge the rear axle housing downwardly (Fig. 3) so that the body of the vehicle is pulled slightly downwardly.

It will be apparent that arms 120, 121 in effect cause the vehicle to behave essentially in the same manner as a conventional automobile behaves when braked while travelling in a reverse direction. That is, the rear end of the body moves downwardly in the usual manner. However, by virtue of the action of arm 43, the body is also moved downwardly when the vehicle is braked while travelling in a forward direction.

It is important to note, however, that the line of action between arms 120, 121 is about vertical so that the best position for arms 120, 121 is exactly that shown in Fig. 3. If said arms were positioned along the lower side of the brake structure so that the line of action between arm 120 and arm 121 were horizontal, the desired downwardly directed pull on the body would not be effected. Instead, merely a counter-clockwise effort would be imparted to the wheel housing which would result in the body being urged upwardly. Thus the exact position of bumper 122 may be varied between the above described limits to attain the desired effect on the body movement.

A modified form of bearing generally designated 58 having certain advantages over that disclosed in Figs. 2 and 5 is illustrated in Fig. 6.

In this case the bearing 58 is provided with a cylindrical portion 59 similar to the cylindrical portion 19 of bearing 18 and secured to the axle housing in the same manner. Integral with portion 59 is a relatively short radially outwardly extending annular flange 60 which carries an annular axially outwardly opening bearing seat generally U-shape in cross-section and generally designated 61. This seat 61 comprises a bottom 62 and a pair of outwardly diverging frusto-conical sides 63, 64.

Backing plate 13 is provided with a hub 66 similar to hub 14 of Fig. 5 and to which is integrally secured an annular channel-like member generally designated 67 having a bottom 68 in spaced opposed relation to bottom 62 of seat 61 and a pair of outwardly diverging frusto-conical sides 69, 70 complementarily formed with respect to sides 63, 64 respectively and adapted to slidably engage the latter. Member 67 is held in engagement with seat 61 by a ring 71 similar to ring 28 of Fig. 5 but having an annular channel portion 72 complementarily formed to member 67 and including a bottom 75 and a pair of frusto-conical sides 73, 74; the latter slidably engaging sides 69, 70 respectively of member 67. The channel shaped member 67 which is carried by backing plate 13 may be held in engagement with bearing seat 61 in the same manner as explained above in connection with Fig. 5—that is, by bolts 30 and nuts 31.

One advantage of the structure of Fig. 6 is that lubrication may be effected by provided apertures 76 through bottom 75 of ring 72 and apertures 77 through bottom 68 of the movable portion 67 carried by backing plate 13. Grease fittings 78 on bottom 75 may be employed to introduce grease to the spaces at opposite sides of bottom 68 from which such grease is supplied to the relatively slidable frusto-conical surfaces.

Another advantage of the modified form of bearing shown in Fig. 6 is that additional supporting surfaces are provided over those afforded in the structure of Fig. 5 and a greater area of bearing contact results. The structure of Fig. 6 is therefore particularly adapted for rugged installations when the additional expense in manufacturing the same is justified.

Figs. 7–11 illustrate the apparatus employed for the front wheels in vehicles such as automobiles and airplanes wherein such wheels are swingable about a vertical axis for steering. In this connection it will be understood that in automobiles the front portion of the body swings downwardly when the brakes are applied and the rear portion swings upwardly. By pulling downwardly on the rear portion of the body the desired result is, to a great degree, achieved, because the motion of the body is generally downwardly which is desirable. However, inasmuch as the greater concentration of weight is generally on the front wheels, the body will usually tend to tip downwardly at the front end despite the transmission of braking torque to the rear end of the body.

In view of the above, I find it desirable in some cases to transmit the braking torque of the front wheels to the body so that the latter is urged slightly upwardly. By properly proportioning the downward and upward thrusts at the rear and front ends of the body respectively I have found that undesirable swing of the front end of the body may be eliminated. In other words, during braking the vehicle behaves as it would if the body were not sprung on the running gear.

Referring to Fig. 7, the front right wheel is generally designated 81 and the backing plate 82 which corresponds to backing plate 13 of Fig. 2 is provided with a plate generally designated 83 identical to bearing plate 6 of Fig. 2. Bearing 84 which slidably supports bearing plate 83 is provided with a generally radially inwardly extending flange 85 which is secured by bolts 86 to the annular disk 87 which is integral with the bearing spindle 88 that carries the front wheel.

Insofar as the coaction of the bearing plate 83 and bearing 84 is concerned, the same is identical to that explained above in connection with the rear wheels.

Depending from the lower edge of plate 83 and integral therewith is an apertured lug 90 which is adapted to receive therethrough one end of a threaded stud 91 which in turn is integrally carried by a ball 92. Stud 91 is provided with an integral collar 93 spaced from said one end which is adapted to abut the side of lug 90 remote from wheel 1. A nut 94 is provided on stud 91 to engage the other side of lug 90, for releasably securing said stud to said lug (Fig. 9).

A socket, generally designated 95 (Fig. 9), is provided on ball 92 to effect a ball and socket joint for a purpose to be described. The socket 95 comprises a cylindrical sleeve 89 provided along one side with an opening 96 adapted to receive ball 92 therethrough. Rigidly secured within sleeve 89 as by welding is a stationary socket piece 97 that is complementarily formed relative to ball 92 along one side thereof as at 98. Cooperating with the opposite side of ball 92 is a movable socket piece 99 which is externally threaded to threadedly engage internal threads 100 formed in sleeve 89. A kerf 101 is provided in the end of piece 99 which is opposite ball 92 so that said piece may be turned with a screw driver for moving the same axially of sleeve 89 into and out of engagement with ball 92 as desired.

From the above described structure it is apparent that universal movement of sleeve 89 relative to ball 92 is possible.

At the end of sleeve 89 opposite the threaded portion 100 a rigid actuating arm 103 is secured to said sleeve as by welding. This arm 103 extends generally rearwardly and upwardly with respect to the front wheel 81 and the particular shape of the same depends upon the adjacent mechanisms which must be cleared. The end of arm 103 remote from sleeve 89 is rigidly secured to a sleeve 104 which receives therein a generally cylindrical resilient socket member 105 preferably of rubber and which is centrally apertured to receive a pin 106 therethrough. This pin 106 is provided with a head 107 at one end to facilitate securement of said pin to longitudinally extending frame member 108 which is usually a channel in most modern cars (Figs. 10, 11).

Between socket member 105 and frame member 108 is a rubber washer 109 for spacing the sleeve 104 from said frame. A threaded nut 110 may be provided at the opposite side of socket member cooperating with threads 111 on the free end of pin 106 for holding socket 105 in place on pin 106. Cotter pin 112 passed through pin 106 prevents backing off of nut 110.

To retain the socket member 105 in sleeve 104 I prefer to form the sleeve 104 with axially spaced radially inwardly extending annular flanges 113 which are adapted to engage complementarily formed radially outwardly opening grooves in socket 105.

In operation, and referring to Fig. 8 wherein the direction of rotation of wheel 1 is indicated by an arrow, when the brakes are applied during forward motion of the vehicle the bearing plate 83 which is carried by the backing plate 82 will rotate counter-clockwise moving lug 90 upwardly and rearwardly resulting in an upward thrust being impressed through the yieldable socket member 105 to the frame 108 of the vehicle.

The actuating arm 103, in addition to transmitting the torque from the front wheel to the body, also acts as an extremely effective stabilizing means. In this connection it should be noted that the universal movement of ball 92 and socket 95 permits the usual steering of the front wheels without affecting such steering in any way. However, in the case of knee-action suspensions in particular, the arm 103 in effect provides a steady rest for the front wheels and obviates the usual stabilizing bar which conventionally extends between the two front wheels.

Bumpers are also provided for limiting the movement of arm 103 in a somewhat similar manner as described above in connection with the rear wheels.

A relatively short arm 130, similar to arms 120, 121, is rigidly secured to the plate 83 to coact with a similar arm 131 secured to bearing 84. A bumper 132 is secured to arm 130 so as to be compressed between the arms upon counter-clockwise swinging of plate 83. In this manner there is always a yieldable resistance to such swinging and no shock is transmitted to the body.

On the opposite side of the wheel, arms 134, 133 are respectively carried by plate 83 and bearing 84. A bumper 135 similar to bumper 132 is secured to arm 134. Arm 133 is normally spaced from bumper 135 so that the latter is not engaged in normal usage, however when the vehicle is braked while traveling in a reverse direction the plate 83 will rotate clockwise as seen in Fig. 8 thus urging the front of the vehicle body downwardly. If the braking effect is very pronounced so that the downward pull on the body tends to become excessive the bumper 135 on arm 134 will engage stationary arm 133 to yieldably resist further action by arm 103.

Fig. 12 illustrates a modified form of the invention shown in Figs. 2 and 5. In this case, the bearing 115 for rotatably supporting the bearing plate 6 is identical to that shown in Figs. 2 and 5 except cylindrical portion 19 (Figs. 2, 5) is omitted and the bearing 115 is directly secured to the axle housing 9 by a radially inwardly extending annular flange 116. The inner edge of flange 116 may be welded as at 117 to the axle housing. This arrangement is less expensive that that shown in Figs. 2 and 5 and at the same time insures a rigid support for the bearing.

With reference to the bumper 49 and member 45 (Fig. 4), it will be apparent that undesirable sidesway of the body relative to the running gear will be prevented by engagement of bumper 49 with plate 62 or engagement of head 56 by member 45. By varying the thickness of bumper 49 and its spacing from plate 52 any desired limiting effect may be achieved.

It should be noted that the arm 103 is shown in Fig. 1 as connected to the frame at a point rearwardly of the front wheel. The exact position of this connection will, however, depend on the weight of the motor, the area of the brake shoes and other factors.

Although arm 103 is shown rigidly secured to sleeve 89, it may be adjustably although fixedly secured by providing a threaded member for attachment to said sleeve. However, once the correct active length of arm 103 is determined, no further adjustment should be required.

It should be further be noted that, although the connection of arm 43 to the frame should be at a point within the laterally projected confines of the wheel including the tire, the same is not necessarily true with respect to the front wheel arm 103 as above explained.

The backing plate bearings hereinbefore described may be the same for both front and rear wheels thus making the installation of the same more economical.

It might be repeated here that the provision of bumpers 122, 45 and 49 in the rear end and the bumpers 132, 135 in the front end makes the conventional stabilizing bars unnecessary because the body is under yieldable restraint at all times and excessive movement of the body relative to the running gear is prevented.

It will also be observed that when the brakes are applied while the vehicle is moving in a reverse direction, the front end of the car will be urged downwardly which is desirable.

I claim:

1. A device for use in a braking system for a vehicle wheel that is rotatable on an axle on which a frame is sprung and which wheel includes a braking surface rotatable therewith and a backing plate rotatable relative thereto carrying a braking element movable into and out of engagement with said surface comprising; a bearing have a frusto-conical bearing surface radially outwardly of said axle, means for securing said bearing rigidly to said axle in a position coaxial with the latter, a bearing plate having a surface complementary to and in slidable engagement with said bearing and having an extension projecting radially therefrom, separate means for securing said bearing plate to said backing plate and to said frame respectively, a radially extending flange on said bearing in opposed relation to said extension, an annular member coaxial with said axis, said extension being rotatable between said flange and said member and means for holding said annular member in slidable engagement with said extension and for holding said bearing plate in slidable engagement with said bearing.

2. A device for use in a braking system for a vehicle wheel that is rotatable on an axle on which a frame is sprung and which wheel includes a braking surface rotatable on an axle on which a frame is sprung and which wheel includes a braking surface rotatable therewith and a backing plate rotatable relative thereto carrying a braking element movable into and out of engagement with said surface comprising; an annular bearing surrounding said axle and formed with radially inwardly and radially outwardly concentrically disposed oppositely inclined frusto-conical bearing surfaces, means for rigidly securing said bearing to said axle in a position coaxial with the latter, a bearing plate having frusto-conical surfaces complementary to and in slidable engagement with said bearing surfaces, means in engagement with said bearing plate for holding it in said slidable engagement, and means for securing said bearing plate to said frame at a point eccentric to the axis of said plate and within the laterally projected confines of such wheel.

3. A device for use in a braking system for a vehicle wheel that is rotatable on an axle on which a frame is sprung and which wheel includes a braking surface rotatable on an axle on which a frame is sprung and which wheel includes a braking surface rotatable therewith and a backing plate rotatable relative thereto carrying a braking element movable into and out of engagement with said surface comprising; an annular bearing surrounding said axle and formed with radially inwardly and radially outwardly concentrically disposed oppositely inclined frusto-conical bearing surfaces, means for rigidly securing said bearing to said axle in a position coaxial with the latter, a bearing plate having frusto-conical surfaces complementary to and in slidable engagement with said bearing surfaces, means in engagement with said bearing plate for holding it in said slidable engagement, and means for securing said bearing plate to said frame at a point eccentric to the axis of said plate and within the laterally projected confines of such wheel, said last mentioned means including a yieldable joint at said point.

4. In combination with a vehicle having front and rear ground wheels respectively rotatable on front and rear axles, a frame sprung on said axles, a braking member rigid with each wheel having a braking surface, a backing plate adjacent to each of the braking members, a braking element on each backing plate supported for movement with each backing plate and also supported for movement into and out of frictional engagement with the braking surface on the braking member that is adjacent thereto, a bearing rigid with each axle adjacent to each backing plate, a bearing plate rigid with each backing plate and positioned adjacent to each backing plate for rotation therewith and supported against each bearing for rotation relative to the latter, arms rigid with the bearing plates for said rear wheels extending forwardly generally toward said front wheels, means connecting the forward ends of said arms with said frame at points adjacent to the laterally projected peripheral outlines of said rear wheels, arms connected to the bearing plates for said front wheels extending rearwardly and generally toward said rear wheels, each of said last mentioned arms connecting a point on said frame and a point on one corresponding backing plate with the line of action between said points being rearwardly of the axis of such backing plate whereby application of said braking elements to the braking surfaces of all of said wheels simultaneously when said vehicle is moving in a forward direction, will tend to depress the rear end of said frame and will tend to elevate its front end through transmission of the braking torque of said wheels to said frame through said arms.

5. A stabilizer for a front wheel of an automobile comprising one only elongated arm extending generally from the lower side of said wheel in a rearwardly and upwardly direction and secured at its upper end to the frame of said automobile, a bearing plate rigid with the backing plate of said wheel and adapted to rotate with said backing plate when the brake shoes of said wheel engage the brake drum thereof, a bearing for rotatably supporting said bearing plate and said backing plate, said arm being secured at its lower end to said bearing plate whereby said arm will thrust said frame upwardly when the brakes of said automobile are applied.

6. A stabilizer for a front wheel of an automobile having a backing plate comprising an elongated arm extending generally from the lower side of said wheel in a rearwardly and upwardly direction and secured at its upper end to the frame of said automobile, a bearing plate rigid with the backing plate of said wheel and adapted to rotate with said backing plate when the brake shoes of said wheel engage the brake drum thereof, a bearing for rotatably supporting said bearing plate and said backing plate, said arm being secured at its lower end to said bearing plate with its line of action rearwardly of the axis of said wheel whereby said arm will thrust said frame upwardly when the brakes of said automobile are applied, a universal joint between said lower end of said arm and said bearing plate to permit swinging said wheels about a substantially vertical axis free from restraint by said arm.

7. A stabilizer for a front wheel of an automobile having a backing plate comprising an elongated arm extending generally from the lower side of said wheel in a rearwardly and upwardly direction and secured at its upper end to the frame of said automobile, a bearing plate rigid with the backing plate of said wheel and adapted to rotate with said backing plate when the brake shoes of said wheel engage the brake drum thereof, a bearing for rotatably supporting said bearing plate and said backing plate, said arm being secured at its lower end to said bearing plate with its line of action rearwardly of the axis of said wheel whereby said arm will thrust said frame upwardly when the brakes of said automobile are applied, a yieldable socket member carried by the upper end of said arm and a pin rigid with the frame of said automobile and received in said socket for so securing the upper end of said arm to said frame.

8. In combination with a vehicle having front and rear ground wheels respectively rotatable on front and rear axles, a frame sprung on said axles, a braking member rigid with each wheel having a braking surface, a backing plate adjacent to each of the braking members, a braking element on each backing plate supported for movement with each backing plate and also supported for movement into and out of frictional engagement with the braking surface on the braking member that is adjacent thereto, a bearing rigid with each axle adjacent to each backing plate, a bearing plate rigid with each backing plate and positioned adjacent to each backing plate for rotation therewith and supported against each bearing for rotation relative to the latter, arms rigid with the bearing plates for said rear wheels extending forwardly generally toward said front wheels, means connecting the forward ends of said arms with said frame at points adjacent to the laterally projected peripheral outlines of said rear wheels, arms connected to the bearing plates for said front wheels extending rearwardly and generally toward said rear wheels with their lines of action rearwardly of said front axles, means connecting said last mentioned arms with said frame at their rear ends whereby application of said braking elements to the braking surfaces of all of said wheels simultaneously, will tend to depress the rear end of said frame and will tend to elevate its front end through transmission of the braking torque of said wheels to said frame through said arms, a yieldable element interposed between said arms and said frame for yieldably resisting sidewise movement of said frame relative to said arm and vice versa.

9. In a braking system for a vehicle having a wheel that is rotatable on an axle on which a frame is sprung and which wheel includes a braking surface rotatable therewith and a backing plate rotatable relative to said axle and carrying a braking element movable into and out of engagement with said surface, means for connecting said backing plate to such frame at a point laterally eccentric to said axle, a compressible bumper operatively connected between said axle and said backing plate for yieldably resisting relative movement therebetween when said vehicle is braked while traveling in a reverse direction.

10. In a braking system for a vehicle having a wheel that is rotatable on an axle on which a frame is sprung and which wheel includes a braking surface rotatable therewith and a backing plate rotatable relative to said axle and carrying a braking element movable into and out of engagement with said surface, means for connecting said backing plate to such frame at a point laterally eccentric to said axle, a compressible bumper operatively connected between said axle and said backing plate for yieldably resisting relative movement therebetween when said vehicle is braked while traveling in a reverse direction, a pair of radially outwardly extending arms respectively connected with said axle and said backing plate for so operatively connecting said bumper between said axle and said backing plate, said bumper being carried at the free ends of said arms.

11. In a vehicle braking system including a ground wheel rotatable on an axle on which a frame is sprung and which wheel includes a braking surface rotatable therewith and a backing plate rotatable relative to said axle, means for stabilizing the frame of said vehicle relative to said wheel comprising a generally radially outwardly extending arm rigid with said backing plate and engageable with said frame at its outer end for urging said frame downwardly when said backing plate is rotated relative to said axle in one direction, a compressible member and means respectively carried by said axle and said backing plate for compressing said member when said backing plate is rotated in the opposite direction.

12. In a vehicle braking system including a ground wheel rotatable on an axle on which a frame is sprung and which wheel includes a braking surface rotatable therewith and a backing plate rotatable relative to said axle, means for stabilizing the frame of said vehicle relative to said wheel comprising a generally radially outwardly extending arm rigid with said backing plate and engageable with said frame at its outer end for urging said frame downwardly when said backing plate is rotated relative to said axle in one direction, a compressible member and means respectively carried by said axle and said backing plate for compressing said member when said backing plate is rotated in the opposite direction, said arm being unsecured at its outer end to said frame whereby said outer end will separate from said frame during movement of said backing plate in said opposite direction.

References Cited in the file of this patent

UNITED STATES PATENTS

| | | |
|---|---|---|
| 714,950 | Richards | Dec. 2, 1902 |
| 1,961,848 | Frank | June 5, 1934 |
| 2,194,908 | Molzer | Mar. 26, 1940 |
| 2,299,726 | Baselt et al. | Oct. 27, 1942 |
| 2,395,072 | Sauer | Feb. 19, 1946 |
| 2,429,815 | House | Oct. 28, 1947 |
| 2,434,055 | Sauer | Jan. 6, 1948 |